United States Patent [19]
Kim et al.

[11] Patent Number: 5,206,758
[45] Date of Patent: Apr. 27, 1993

[54] BINOCULARS WITH VARIABLE AND FIXED FOCUS ADJUSTMENTS

[75] Inventors: Byung-Sun Kim, Borken; Rudolf Bresser, Heiden, both of Fed. Rep. of Germany

[73] Assignee: Josef Bresser Import-Export GmbH & Co., Borken, Fed. Rep. of Germany

[21] Appl. No.: 887,250

[22] Filed: May 19, 1992

Related U.S. Application Data

[63] Continuation of Ser. No. 594,125, Oct. 9, 1990, abandoned.

[30] Foreign Application Priority Data

Oct. 10, 1989 [DE] Fed. Rep. of Germany ....... 3933793
Nov. 4, 1989 [EP] European Pat. Off. ........ 89120421.6

[51] Int. Cl.$^5$ ............................................. G02B 7/06
[52] U.S. Cl. ..................................... 359/414; 359/418
[58] Field of Search ............... 350/552, 556, 555, 554, 350/548; 359/414, 418, 417, 416, 410

[56] References Cited

U.S. PATENT DOCUMENTS 4,818,086 8/1989 Moore .................................. 350/552
5,028,123 7/1991 Watanabe et al. .................. 359/414

FOREIGN PATENT DOCUMENTS 48806 2/1889 Fed. Rep. of Germany .
301184 6/1914 Fed. Rep. of Germany .

Primary Examiner—Jon W. Henry
Attorney, Agent, or Firm—Kinney & Lange

[57] ABSTRACT

A pair of binoculars in which the ocular abridgements are connected through a bridge and can be activated through a center drive. The center drive comprises a rotatable knurled element and a guide pin, whereby the center drive serves customary adjustment of the focus. A Fix-Focus-Adjustment is provided by a knurled ring of the guide pin, whereby conventional focus adjustment is released by way of a knurled ring and the stop is neutralized with a stop ring.

8 Claims, 1 Drawing Sheet

BINOCULARS WITH VARIABLE AND FIXED FOCUS ADJUSTMENTS

This is a continuation of application Ser. No. 07/594,125, filed Oct. 9, 1990, abandoned as of the date of this application.

BACKGROUND OF THE INVENTION

The invention relates generally to binoculars having ocular abridgements connected to each other through a bridge and activated through a center drive.

The binoculars according to the invention include a bridge connecting a pair of oculars that may be positioned at a fixed distance corresponding to the distance between the eyes of a user. Preferably, they are made adjustable to various individual positions by means of a hinge. Additionally, these binoculars allow normal focus control for persons wearing glasses or persons with normal eyesight through a center drive. One or both oculars may be fitted with a diopter focusing mount intended for persons with glasses who do not use glasses when using binoculars. The binoculars according to the invention are therefore adaptable to a large extent to the requirements of a broad range of people.

The center drive of the binoculars according to the invention are conventional and therefore of a practical design. The knurled knob may be manufactured as a knurled wheel, knurled-head screw or knurled roller. A knurled roller can be placed in the hinge, whereas knurled wheels or knurled disks may be placed above or below the bridge. Using these various configurations, a variety of requirements can be fulfilled.

The binoculars of the present invention makes use of features of known binoculars, particularly a center drive and a diopter focusing mount. The center drive can be made in the form of a sharp-focusing rocker. These types of binoculars have the advantage that they can be adjusted individually for each user. This is carried out in a known way by adjusting the binoculars for a certain large distance, say 150 meters, taking into consideration the depth of focus. This diopter focusing is carried out by the user, who in general turns a diopter ring near one or both oculars. When this adjustment is made any depth of focus can be achieved by turning the center drive, without the user having to put on his glasses.

It is a disadvantage that the adjustment of binoculars poses considerable individual problems for the eyes of the individual user, whereby many users are unable to properly use binoculars.

Therefore, attempts have been made to make the adjustment of binoculars easier to carry out for the user. One embodiment of such binoculars having ease of adjustment makes use of individual adjustment of each ocular. The focusing adjustment is carried out by turning a left or right diopter ring, that at the same time takes care of the adjustment for distance. The disadvantage of this type of binoculars is that the once adjusted focusing depth can only be changed by adjusting each of the oculars. This lengthens the time required to change the depth focus adjustment. In practice, this makes adjustment of the binoculars difficult which lengthens the time required to adjust the binoculars.

Another attempt to make the adjustment of the depth of focus easier for the user is to provide the binoculars with a Fix(ed)-Focus-Adjustment. In this type of binoculars, the optical system of the binoculars has a fixed setting of approximately 70 to 80 meters. Is therefore not possible to change the setting. This type of binoculars can be used without any adjustments by persons with 20/20 vision or persons wearing glasses, and objects in the focus range appear clear at a distance from 14 meters to 80 meters. The disadvantage of the fixed-focus-adjustment of the depth focusing to, say 80 meters, is that observation at infinity does not allow distortionless detail focusing, and it relies on the accommodation power of the user's eye itself. This accommodation of the user's eye leads to overstressing, which can lead to headaches for the viewer. Also, the already short range of the binoculars can be shortened to only about 14 meters, because otherwise flawless detail focusing cannot be obtained. In addition, users with eye defects in one or both eyes cannot use this type of binoculars without an optical support, that is to say, these binoculars cannot be used without glasses.

The invention has as its goal to create binoculars, that avoid incorrect adjustments by the user and exclude to a large extent the disadvantages described above.

This goal is achieved by the binoculars of the present invention with characteristics according to the claims.

SUMMARY OF THE INVENTION

The binoculars of the present invention have a center drive for focus control for all distances. The center drive is fitted with a knurled-knob and a stop ring, which creates two further fixed-focus-adjustments, the disadvantages of which can be overcome by a Dual-Focus-Adjustment. This Dual-Focus Adjustment makes possible individual Fixed-Focus-Adjustment at a short range which can go from say 6 meters to 14 meters, and a long range, which can be adjusted from approximately 14 meters to infinity. Therefore, the binoculars can be used by people with full vision and/or impaired vision without the use of glasses.

The invention has the advantage that the binoculars can be used for all ranges using the Dual-Focus-Adjustment, and the change from short range Fixed-Focus to long range Fixed-Focus can be accomplished through a shift of the drive. On the other hand the binoculars according to the invention can be used as conventional binoculars with adjustment to any arbitrary range of focus.

Persons unfamiliar with binoculars can avoid mistakes by using the Dual-Focus-Adjustment. Persons familiar with the binoculars can use it as usual, but can exploit the advantages of a Fixed-Focus-Adjustment. The advantages are that the user of the binoculars can make object adjustments considerably faster at various ranges.

Preferably, the binoculars of the present invention result in a simple design having a Fixed-Focus-Adjustment for all ranges, as well as, a simple-to-handle adjustment on the conventional adjustment for the binoculars.

The Fixed-Focus-Adjustment with the stop ring results in a further simplified design.

The additional adjustment possibilities of the binoculars allows operation without errors, even when the user holds the binoculars in front of his eyes. The two additional possibilities for range adjustments, which are offered by the binoculars according to the invention, are an axial extension of the normal adjustment.

Precise operation of a stop ring is assured through the distribution of the stop action over several ring surfaces that come to rest against each other.

The details, further characteristics, and advantages of the invention arises from the following description of the invention.

DETAILED DESCRIPTION OF THE PREFERRED EMBODIMENTS

Figure 1:
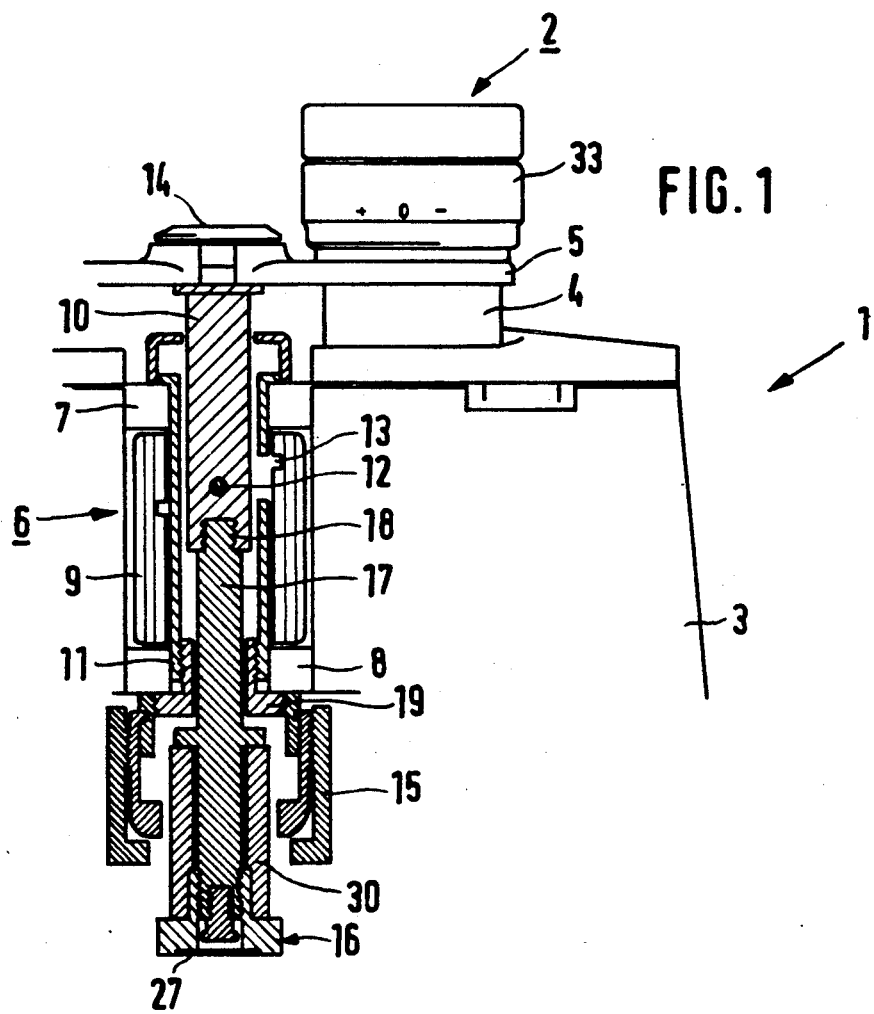
FIG. 1 illustrates binoculars according to the present invention showing the parts making up the drive for the ocular.

As seen in FIG. 1, binoculars 1 comprise a prism glass in which the distance between the objectives (not shown) is greater than the distance between oculars 2 (only one of which is shown). Prism housings 3 (only one of which is shown) serve to guide ocular abridgements 4 (only one of which is shown). The two ocular abridgements 4 are connected to each other by a bridge 5. Along the optical center axis, a center drive 6 is positioned between two bridge hinges 7 and 8 that connect the two prism housings 3. The center drive 6 has two movable parts, namely a knurled roller 9 and a guide pin 10. The knurled roller 9 and guide pin 10 are supported by a fixed tube 11. A guide rod 12 of the guide pin 10 runs in a spiral formed track 13 which is cut in the inner cylinder of the knurled roller 9. The multiple-piece fixture 14 formed by the guide pin 10 on the bridge 5 of the two ocular abridgements 4 can be activated in one of two directions.

As explained below, the binoculars 1 have a Fixed-Focus-Adjustment carried out by means of the center drive 6 and a knurled ring 15 that can be fixed in position. This arrangement makes possible a Dual-Focus-Adjustment which is assured by an axial adjustable stop ring 16.

The guide pin 10 length is extended by way of extension shaft 17. The extension shaft 17 is rigidly attached at 18 to the guide pin 10 to provide a rigid connection therebetween. The extension shaft 17 passes through a flanged screw 19 that is supported against the lower bridge hinge 8 and is screwed on to the lower end of the fixed tube 11.

Figures 2, 3:
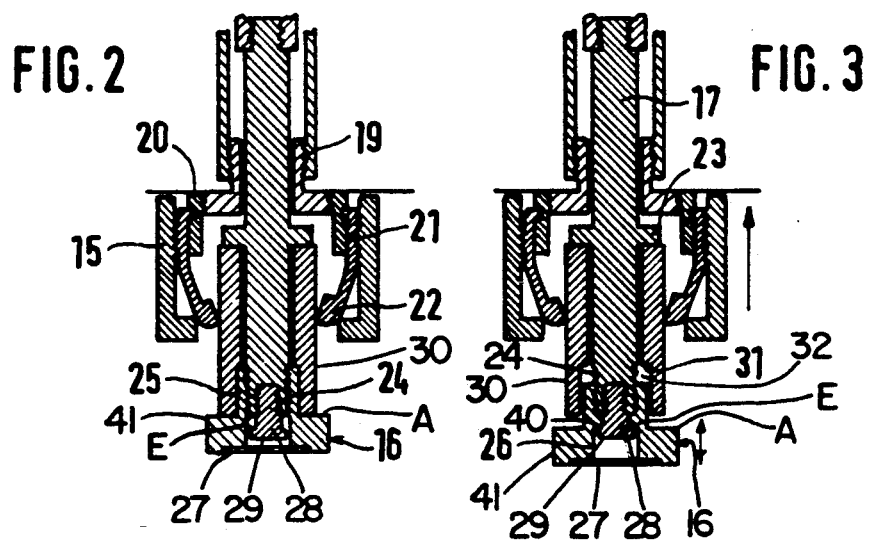
FIG. 2 is a detailed illustration showing the drive position by Fixed-Focus-Adjustment.
FIG. 3 illustrates the various components of a Dual-Focus-Adjustment drive.

As is shown best in FIGS. 2 and 3, a bushing 20 is placed on the flanged screw 19. The bushing 20 accommodates an inner flange of a clamp collar 21 in an outer track. The clamp collar 21 is provided with an inwardly directed clamping jaws 22 and an external thread on its upper cylindrical part, into which an internal thread is cut corresponding to the thread of the knurled ring 15. Comparing FIGS. 1 and 2 the clamping jaws 22 are closed (FIG. 2) when the knurled ring 15 is in its upper position, that is, in a position closer to the lower bridge hinge 8. The clamping jaws 22 are closed as soon as the upper position of the knurled ring 15 is reached, as seen from FIGS. 2 and 3.

The extension shaft 17, that serves as an extension of the pin 10, is provided with a cylindrical flange 23. The extension shaft 17 is provided with a threaded spindle 24 at its free end. The stop ring 16 includes an internally threaded collar 25 which threadably engages the threaded spindle 24 of the extension 17 for axial adjustment. The stop ring 16 has a cylindrical hole 26 which normally is covered by a cover plate 27. The cylindrical hole 26 of the stop ring 16 includes a ring stop surface 40. The stop ring 16 also includes flange 41 defining a retaining surface A. Below the cover plate 27 there is a setscrew 28 having a head 29. The head 29 defines a lower ring surface E which cooperates with the ring stop surface 40 of the collar 25 to define an extended position for the axially adjustable stop ring 16. The setscrew 28 is threadably received in the extension shaft 17.

As seen in FIG. 1, the clamping jaws 22 of the knurled ring 15 act on a fixable tube 30 mounted above the extension shaft 17, to clamp the fixable tube 30 to restrict movement of the fixable tube 30. The fixable tube 30 includes recess 32. The collar 25 of the stop ring 16 is placed in the recess 32. The fixable tube is retained between flange 23 of the extension 17 and the flange 41 of the stop ring 16.

Operation of the binoculars 1 of the present invention is as follows: For basic adjustment the knurled ring 15 is turned so that the clamping jaws 22 release the fixable tube 30 (see FIG. 1). The customary right-hand thread causes the release by turning the knurled stop ring 16 left. Then the knurled stop ring 15 is moved to a position as shown in FIG. 2, that is, the stop ring 16 is along the customary right-hand thread until the engagement surface A of the stop ring 16 engages the fixable tube 30 and the collar 25 of the stop ring 16 abuts the inner ring formed end surface 31 of the fixable tube 30. This fixes the position of the tube 30. Before this happens, the user adjusts the sight on an object at a distance of approximately 150 meters and focuses by turning the center drive 6. As soon as this is done the knurled ring 15 is tightened so that the clamping jaws 22 clamp the tube 30. This is carried out by turning the knurled ring 15 right. The final position of the elements is shown in FIG. 2. The binoculars 1 is then in a Fixed-Focus-Adjustment (i.e. the sharpness is fixed on a range of 15 meters to infinity).

With the elements as shown in FIG. 3, the Dual-Focus-Adjustment is carried out. The stop ring 16 is turned left to the stop (i.e. until ring stop surface 40 of collar 25 presses against lower ring surface E of the head 29 of the setscrew 28). If the user turns the center drive 6 to the right until the engagement surface A of the flange 41 engages the fixable tube 30 or the collar 25 engages the inner ring formed end surface 31 of the fixable tube 30 or the flanged screw 19 restricts flange 23 on the extension shaft 17 (i.e., until flange 23 abuts the fixable tube 30) the Dual-Focus-Adjustment is at far range. If on the other hand, the center drive 6 is turned to the left until flange 23 engages the fixable tube 30, the Dual-Focus-Adjustment is at the near range. The adjustment according to FIG. 3 therefore, is the customary adjustment when using the binoculars 1.

If the binoculars 1 are to be used in a conventional manner to focus on different ranges, then one need only loosen the knurled ring 15. This is carried out by turning the knurled ring 15 left. In this case the center drive 6 can be activated throughout the full range.

The binoculars 1 according to the invention are furnished with a diopter ring 33 whereby, it can be adjusted to a user who normally needs vision help but who when using the binoculars 1 does not want to use vision help.

In the binoculars 1, loosening of the knurled ring 15 and the full movement of the guide rod 12 in the spiral track 13 to move the bridge 5 leads to full extension of the ocular abridgements 4 by turning the knurled roller 9 to the left. A right-hand turning of the knurled roller 9 moves the guide rod 12 in the opposite direction and consequently the ocular abridgements 4 into the infinite focusing range of the prisms glass.

Although the present invention has been described with reference to preferred embodiments, workers skilled in the art will recognize that changes may be made in form and detail without departing from the spirit and scope of the invention.

What is claimed is:

1. Binoculars the ocular abridgement of which are connected through a moveable bridge and which is activated through a center drive that has a drive consisting of a knurled roller that can be turned and a guide pin, the knurled roller being operably coupled with the guide pin to axially move the guide pin along the longitudinal axis to provide normal focus, the bridge being connected relative to the guide pin to provide adjustment wherein the improvement comprises:

a fixable tube supported relative to the guide pin and movable therewith for normal focus adjustment and slidable relative to the guide pin for dual focus adjustment;

means for restricting the slidable movement of the guide pin relative to the fixable tube, said means including an axially adjustable stop ring, the stop ring being adjustable to an extended position for slidable movement of the guide pin between a short range position and a long range position to provide dual focus adjustment, the stop ring restricting slidable movement of the guide pin for long range fixed focus and restricting slidable movement of the guide pin for short range fixed focus adjustment;

a clamping jaw supported for selective engagement with the fixable tube to restrict the translational motion of the fixable tube for fixed focus adjustment; and means for selectively clamping the clamping jaws to alternatively engage the fixable tube for fixed focus adjustment and disengage the fixable tube for normal focus adjustment, whereby for dual focus adjustment the axially adjustable stop ring is selectively positioned for slidable adjustment of the guide pin for long range fixed focus and short range fixed focus.

2. The binoculars according to claim 1 wherein the guide pin includes an extension rigidgly connected to the guide pin and the fixable tube is mounted about an outer circumference of the extension.

3. The binoculars according to claim 2 wherein the extension includes a threaded spindle at a free end and the axially adjustable stop ring includes an internally threaded collar wherein the internally threaded collar of the stop ring is threadably attached to the threaded spindle of the extension for axial adjustment for short range fixed focus and long range fixed focus.

4. The binoculars according to claim 3 wherein the extension includes a setscrew having a head, the setscrew being mounted to the free end of the extension and the stop ring includes a cylindrical hole having a ring stop surface wherein the ring stop surface of the stop ring engages the head of the setscrew to define an extended position of the stop ring.

5. The binoculars of claim 4 wherein the fixable tube includes a recess for placement of the collar of the stop ring for attachment of the collar to the threaded spindle of the extension.

6. The binoculars of claim 4 wherein the stop ring includes a flange to define a retaining surface for engagement with the fixable tube for restricting the slidable movement of the guide pin relative to the fixable tube for long range fixed focus and short range fixed focus.

7. The binoculars of claim 6 wherein when the axially adjustable stop ring is in the extended position, the fixable tube is slidably moved along the extension to align the fixable tube with the retaining surface of the stop ring for long range fixed focus and short range fixed focus.

8. Binoculars the ocular abridgement of which are connected through a moveable bridge and which is activated through a center drive that has a drive consisting of a knurled roller that can be turned and a guide pin, the knurled roller being operably coupled with the guide pin to axially move the guide pin along the longitudinal axis to provide normal focus, the bridge being connected relative to the guide pin to provide adjustment wherein the improvement comprises:

means for restricting the translational motion of the guide pin for fixed focus adjustment, said means for restricting including:

a clamping mechanism, said clamping mechanism adapted to engage a fixing element slidably coupled with the guide pin and moveable therewith for normal focus adjustment;

means for retaining the guide pin to restrict motion of the guide pin relative to fixing element, said means for retaining having an axially adjustable stop ring, the stop ring being adjustable to an extended position for slidable movement of the guide pin relative to the fixing element between a short range position and a long range position to provide dual focus adjustment, the stop ring restricting slidable movement of the guide pin for long range fixed focus and restricting slidable movement of the guide pin for short range fixed focus adjustment; and means for selectively activating the clamping mechanism to alternately engage the fixing element for fixed focus adjustment and disengage the fixing element for normal focus adjustment, whereby for dual focus adjustment the axially adjustable stop ring is selectively positioned for slidable adjustment of the guide pin for long range fixed focus and short range fixed focus.

* * * * *

UNITED STATES PATENT AND TRADEMARK OFFICE
CERTIFICATE OF CORRECTION

PATENT NO. : 5,206,758

DATED : April 27, 1993

INVENTOR(S) : BYUNG-SUN KIM, RUDOLF BRESSER

It is certified that error appears in the above-identified patent and that said Letters Patent is hereby corrected as shown below:

On the title page, item [54] and in column 1, lines 2 and 3, delete "BINOCULARS WITH VARIABLE AND FIXED FOCUS ADJUSTMENTS", and insert --BINOCULARS WITH FIXED FOCUS AND DUAL FOCUS ADJUSTMENT--.

Col. 6, line 39, after "of the guide pin relative to", insert --the--

Signed and Sealed this

First Day of February, 1994

*Attest:*

BRUCE LEHMAN

*Attesting Officer*     *Commissioner of Patents and Trademarks*